United States Patent [19]

Hamanaka

[11] Patent Number: 5,624,219
[45] Date of Patent: Apr. 29, 1997

[54] HIGH-STRENGTH BOLT AND HIGH-STRENGTH NUT

[75] Inventor: Shigenobu Hamanaka, Himeji, Japan

[73] Assignee: Hamanaka Nut Manufacturing Co., Ltd., Hyogo, Japan

[21] Appl. No.: 365,948

[22] Filed: Dec. 29, 1994

[51] Int. Cl.[6] .............................. F16B 39/30; F16B 37/16
[52] U.S. Cl. ........................ 411/308; 411/411; 411/436; 411/917
[58] Field of Search ................................ 411/307, 308, 411/309, 310, 311, 411, 436, 916, 917

[56] References Cited

U.S. PATENT DOCUMENTS

| 1,369,156 | 2/1921 | Woodward | 411/307 |
| 3,323,402 | 6/1967 | Gowan, Jr. et al. | 411/411 |
| 3,433,117 | 3/1969 | Gowan, Jr. et al. | 411/411 |

FOREIGN PATENT DOCUMENTS

| 194042 | 1/1965 | Sweden | 411/310 |

*Primary Examiner*—Neill R. Wilson
*Attorney, Agent, or Firm*—Birch, Stewart, Kolasch & Birch, LLP

[57] ABSTRACT

A high-strength bolt and a high-strength nut is suited for use in combination with a standardized nut and a standardized bolt, respectively. The high-strength bolt and the high-strength nut have an external triangular thread and an internal triangular thread, respectively, of which the angle no greater than the range of each thread ridge differs by an angle of 0°55' to 2° from the angle of standardized thread ridges.

13 Claims, 4 Drawing Sheets

HIGH-STRENGTH BOLT AND HIGH-STRENGTH NUT

BACKGROUND OF THE INVENTION

1. Field of the Invention

The present invention relates generally to a bolt and a nut. More particularly, the present invention relates to a high-strength bolt and a high-strength nut capable of stably providing a desired tightening torque, when used with a standardized nut and a standardized bolt, respectively.

2. Description of Related Art

A bolt and nut set is in wide practical use today for clamping two or more elements. So ensuring a desired clamping force, it is particularly important to make the tightening torque stable. The tightening torque T is generally represented as a function of the nominal diameter d of bolts and, theoretically, so long as the bolts have the same nominal diameter d, the same tightening operation provides substantially the same tightening torque, thus ensuring a desired clamping force.

In practice, however, such a desired clamping force cannot be stably obtained. The reason for this is that bolts and nuts are generally manufactured by forging, rolling, tapping, or the like and, hence, the flanks of thread ridges are not smooth flat planes, resulting in variations in contact pressure between the flanks of the thread ridges of the bolt and those of the thread ridges of the nut (see FIG. 3B depicting the load distribution F2). In general, the contact of the bolt and the nut under pressure with elements to be clamped thereby is followed by contraction of the nut and expansion of the shank extending between the bolt head and the nut. At this moment, the thread ridges of the bolt and those of the nut tend to deform in opposite directions, and the load acting on the thread ridges differs in a direction axially of the bolt. As a result, even a small unintentional error during the tightening operation occasionally causes a variation in the tightening torque, which in turn causes a somewhat variable axial tension of the bolt. For this reason, the actual circumstances are such that commercially available bolts and nuts cannot provide the desired clamping force.

To overcome the above-described problem, a high-strength bolt of a type being sheared by torque has hitherto been proposed having a grid portion formed at a free end of the shank thereof and a notched neck, which is sheared by a predetermined tightening torque acting on the grip portion.

However, because this kind of high-strength bolt requires processing to form the notched neck in the shank thereof, not only the manufacture thereof is very troublesome, but also the tightening torque greatly depends upon the processing accuracy of the notched neck. Accordingly, the manufacture of this bolt requires highly accurate processing. Also, the problem remains in that when the bolt is coupled with a nut for clamping, partial variations contact pressure between the flanks of the thread ridges of the former and those of the thread ridges of the latter make the axial tension of the bolt variable and the clamping force unstable.

SUMMARY OF THE INVENTION

The present invention has been developed to overcome the above-described disadvantages.

It is accordingly an objective of the present invention to provide a bolt and a nut whereby a desired tightening torque can be stably obtained, when used in combination with a standardized nut and a standardized bolt, respectively.

In accomplishing the above and other objectives, the high-strength bolt according to the present invention comprises a head, a shank integrally formed with the head, and an external triangular thread formed on the shank and having thread ridges of an angle which is greater or smaller by an angle of 0°55' to 2° than the angle of standardized thread ridges.

On the other hand, the high-strength nut according to the present invention comprises an internal triangular thread having thread ridges of an angle which is greater or smaller by an angle of 0°55' to 2° than the angle of standardized thread ridges.

It is particularly important for the high-strength bolt of the present invention and the high-strength nut of the present invention to be used in combination with a standardized nut and a standardized bolt, respectively. By doing so, the load acting on the contact area between flanks of the thread ridges of the bolt and associated flanks of the thread ridges of the nut is maximized at a location spaced my a predetermined distance from the center axis of the bolt, thus providing a stable tightening torque.

It is to be noted here that the triangular thread referred to above may be a metric screw thread, unified thread series, Whitworth screw thread, or any other thread with thread ridges which have a generally triangular section in a direction axially thereof.

As described above, the high-strength bolt or nut the present invention has thread ridges whose angle is chosen so as to be greater or smaller by an angle of 0°55' to 2° than the angle of the standardized thread ridges. Because the angle of the standardized thread ridges of the triangular thread is 60° or 55°, if the difference in angle is smaller than 0°55', then the area between the flanks of the thread ridges of the bolt and the associated flanks of the thread ridges of the nut on which the maximized load acts is extended. This makes the affection by inaccurate processing conspicuous. On the other hand, if the difference in angle is greater than 2°, it becomes difficult to smoothly engage the bolt and the nut with each other.

When the high-strength bolt is coupled with a standardized nut or when the high-strength nut is coupled with a standardized bolt to clamp two or more elements, the flanks of the thread ridges of the high-strength bolt or nut are brought into contact, on their root or crest side, with those of the thread ridges of the standardized nut or bolt, respectively. A subsequent tightening of the high-strength bolt or the standardized bolt with respect to the standardized nut or the high-strength nut gradually engages the thread ridges of the former with those of the latter.

A further tightening increases the contact pressure between the head of the bolt and the elements to be clamped and between the nut and the latter, resulting in contraction of the nut and expansion of the shank of the bolt. At this moment, the thread ridges of the bolt and those of the nut deform in opposite directions. Upon completion of the clamping, the flanks of the thread ridges of the bolt and those of the thread ridges of the nut are held in contact substantially at their entire surfaces with each other under pressure, and the load acting on those portions of the thread ridges of the bolt and the nut that are first brought into contact is maximized by the deformation of the thread ridges.

Such portions of the thread ridges generally depend upon the difference in angle of the thread ridges between the high-strength bolt or the standardized bolt and the standardized nut or the high-strength nut. Because the distances from the center axis of the shank to such portions are substantially constant for almost all of the thread ridges, the tightening torque is not so affected by unevenness of the flanks of the thread ridges caused by the processing accuracy. Accordingly, as compared with clamping by the conventional bolts and nuts in which the contact pressure of the flanks of the thread ridges varies to some extent, the tightening torque is stabilized, and even if the tightening operation is accompanied with some errors, the tightening torque varies little. As a result, the axial tension of the bolt is stabilized, ensuring a desired clamping force.

Furthermore, the bolts and the nuts of the present invention can be obtained by modifying the angle of the thread ridges of the commercially available bolts and nuts manufactured by tapping or rolling, respectively, so that the highly pressurized portions of the flanks of the thread ridges may be positioned on their root or crest side. Accordingly, the conventional manufacturing line can be used as it now stands.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
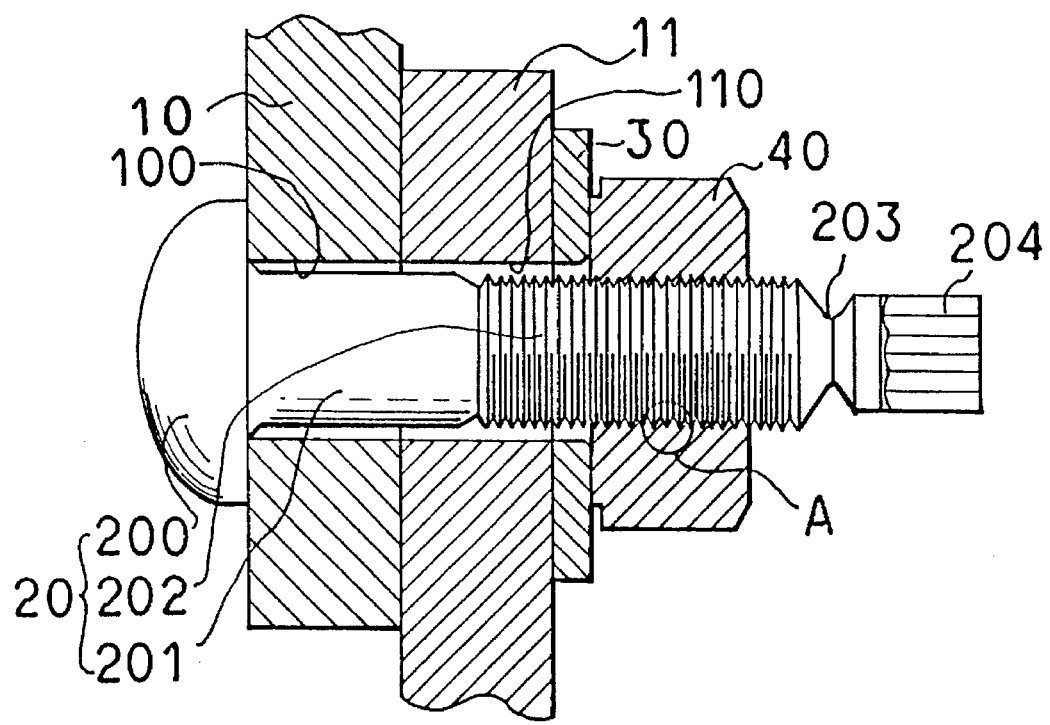
FIG. 1 is a front view of a high-strength bolt according to a first embodiment of the present invention, particularly indicating the clamping condition partly in section.
Figure 2:
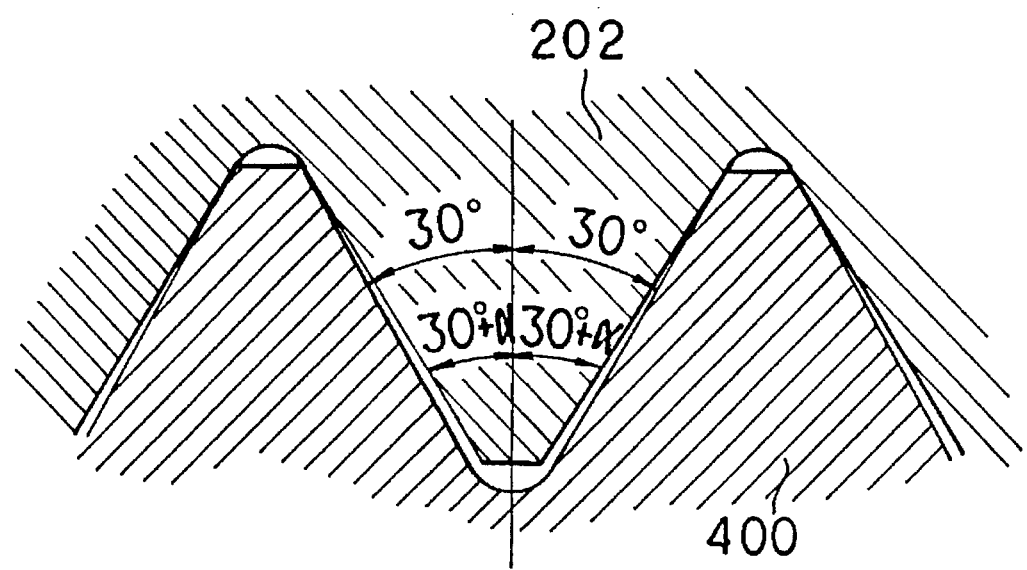
FIG. 2 is a sectional view, on an enlarged scale, of a portion A in FIG. 1, particularly indicating the relationship between an external thread of the high-strength bolt of the present invention and an internal thread of a standardized nut in engagement with each other.

Referring now to the drawings, there is shown in FIGS. 1 and 2 a high-strength bolt 20 according to a first embodiment of the present invention.

As shown in FIG. 1, members 10 and 11 to be clamped have respective through-holes 100 and 110 defined therein, through which the bolt 20 extends, that is coupled with a standardized nut 40 via a washer 30 to clamp the two members 10 and 11. The bolt 20 has a head 200, a shank 201 integrally formed with the head 200, an external thread 202 formed on the shank 201 at a generally middle portion thereof, and a grip portion 204 spaced from the external thread 202 by a notched neck 203 defined in the shank 201.

FIG. 2 depicts a thread ridge of the external thread 202 in engagement with an internal thread 400 of the standardized nut 40. As shown therein, the external thread 202 is a metric screw thread with thread ridges each having a generally triangular configuration in section in a direction axially thereof. The angle of each thread ridge of the external thread 202 is chosen so as to be greater than 60°, i.e., the angle of each thread ridge of the bolt is greater by a predetermined angle 2α, which ranges from 0°55' to 2° and is, for example, 1.2°. On the other hand, the standardized nut 40 has an internal thread 400 of which the angle between two opposing flanks is 60°.

In clamping the two members 10 and 11, a clamping device (not shown) is first set so as to hold the grip portion 204 of the bolt 20. As the bolt 20 is tightened by the clamping device with respect to the standardized nut 40, that portion of each flank of the bolt 20 which is close to the root thereof is brought into contact with an associated flank of the standardized nut 40, as best shown in FIG. 2. Under such conditions, when the clamping device starts the clamping of the two members 10 and 11, and when the head 200 of the bolt 20 and the standardized nut 40 contact with the member 10 and the washer 30 under pressure, respectively, the standardized nut 40 gradually contracts while the shank 201 of the bolt 20 gradually expands.

A further clamping results in cutting of the notched neck 203, terminating the clamping.

Figure 3A:
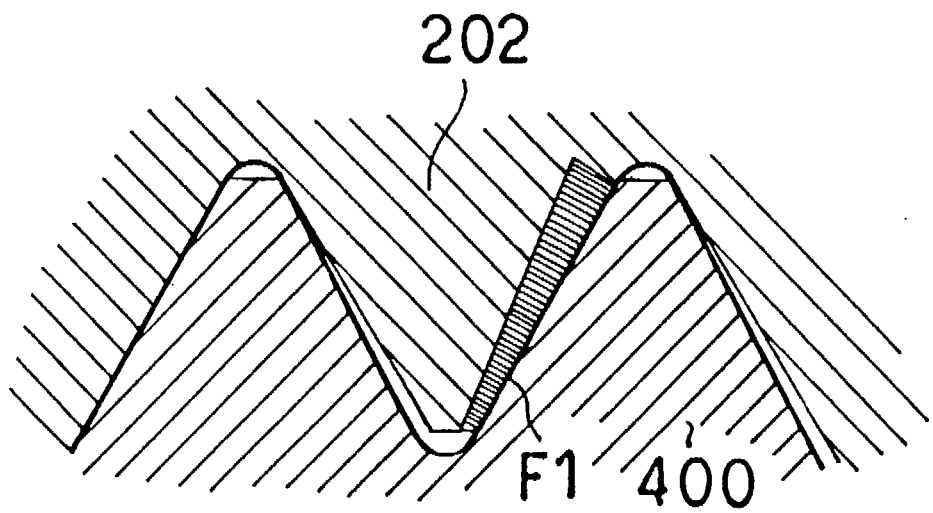
FIG. 3A is a view similar to FIG. 2, but indicating load distribution at the contact area between the flank of a thread ridge of the external thread and that of an associated thread ridge of the internal thread.
Figure 3B:
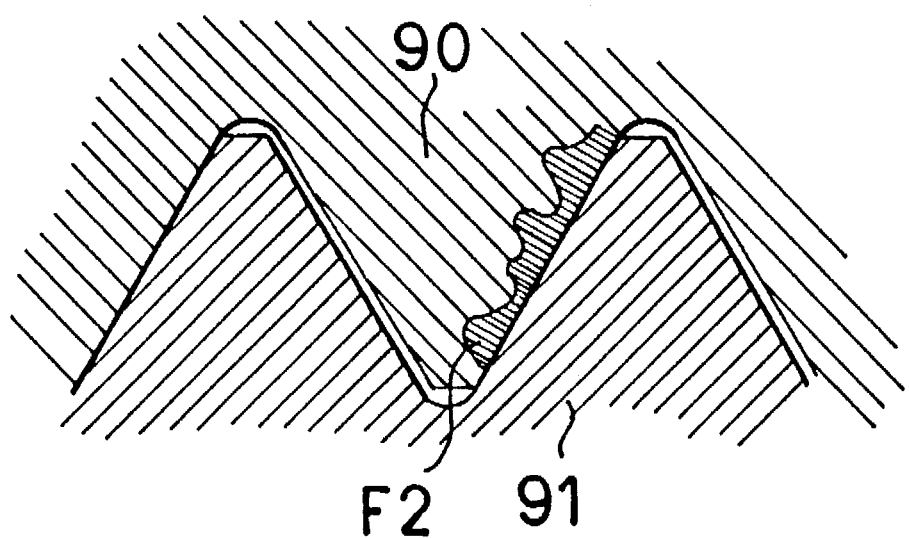
FIG. 3B is a view similar to FIG. 2, but indicating the load distribution at the contact area between the flank of a thread ridge of an external thread of a standardized bolt and that of an associated thread ridge of an internal thread of a standardized nut.

FIG. 3A depicts the load distribution F1 at the contact area between the flank of each thread ridge of the bolt 20 and that of an associated thread ridge of the standardized nut 40 in a direction axially of the bolt 20. As shown therein, the opposing flanks are held in pressure contact with each other as a whole due to deformation of the thread ridges. However, a maximized load acts on that portion of the flank of the bolt 20 which is close to the root thereof and has been first brought into contact with the flank of the standardized nut at the time of initial tightening.

More specifically, as shown in FIG. 3A, the load acting on the flank is maximized at a location close to the root of the thread ridge due to the configuration of the thread ridge of the bolt 20, and gradually reduces towards the crest of the thread ridge. The load distribution F1 shown in FIG. 3A is found to be stable compared with the load distribution F2 between the flank of a thread ridge 90 of the standardized bolt and that of an associated thread ridge 91 of the standardized nut. Accordingly, the pressure of contact between the opposing flanks of the two thread ridges of the bolt and the nut is maximized at a location spaced by a predetermined distance from the center axis of the bolt. Such being the circumstances, even if the processing accuracy of the flanks of the thread ridges is undesirably low, a substantially constant tightening torque can be obtained and, hence, the axial tension of the bolt is stabilized, thus ensuring a desired clamping force.

Figure 4:
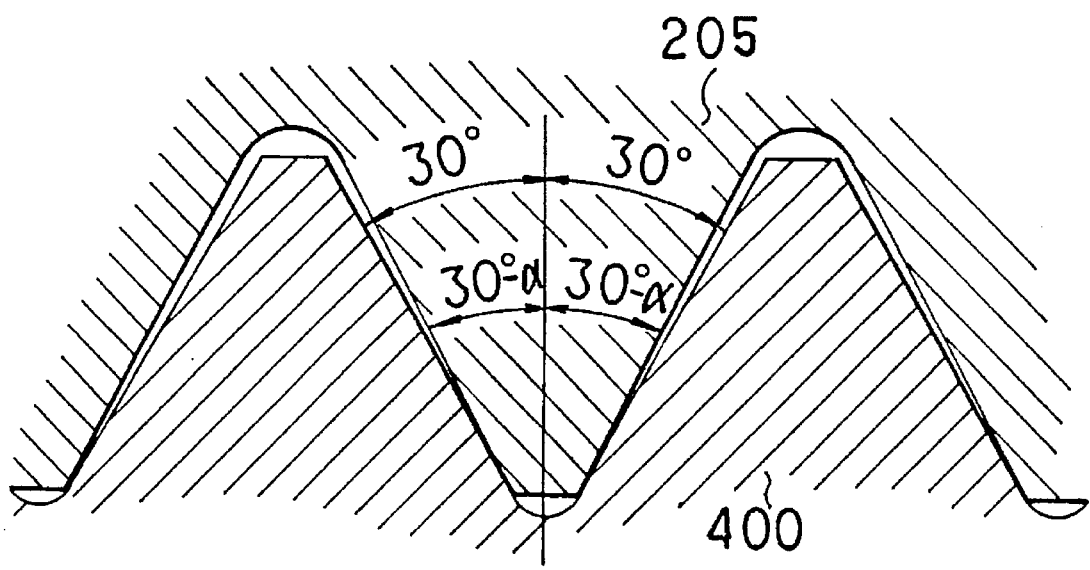
FIG. 4 is a view similar to FIG. 2, but according to a second embodiment of the present invention.

FIG. 4 depicts a high-strength bolt according to a second embodiment of the present invention.

This bolt has an external thread 205 of which the angle of each thread ridge is chosen so as to be smaller than 60°, i.e., the angle of each thread ridge of the standardized is smaller bolt by a predetermined angle 2α, which ranges from 0°55' to 2° and is, for example, 1.5°.

Figure 5:
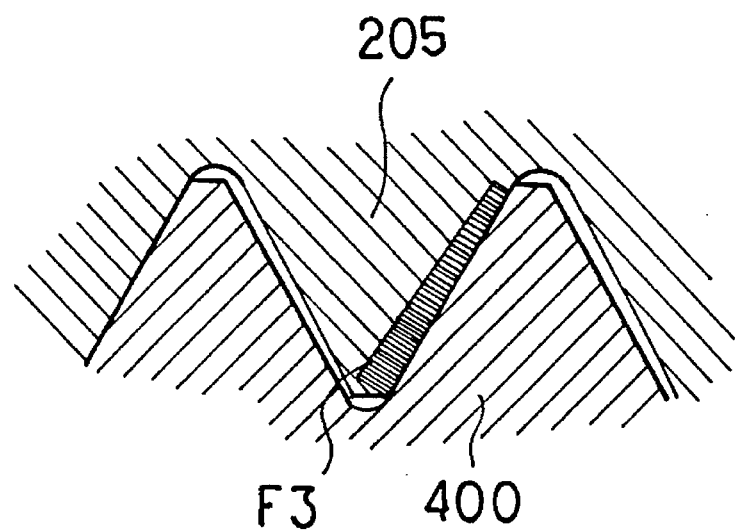
FIG. 5 is a view similar to FIG. 3A, but indicating the load distribution at the contact area in FIG. 4.

In this embodiment, upon completion of clamping, the load distribution at the contact area between the flank of each thread ridge of the external thread 205 and that of an associated thread ridge of a mating internal thread 400 is indicated by F3 in FIG. 5 and is in an inverse relationship with the load distribution F1 shown in FIG. 3A. Accordingly, as shown in FIG. 5, the load acting on the flank of each thread ridge of the bolt is maximized at the crest thereof, and gradually reduces towards the root of the thread ridge. However, this embodiment provides substantially the same operation and effects as those in the first embodiment.

Figure 6:
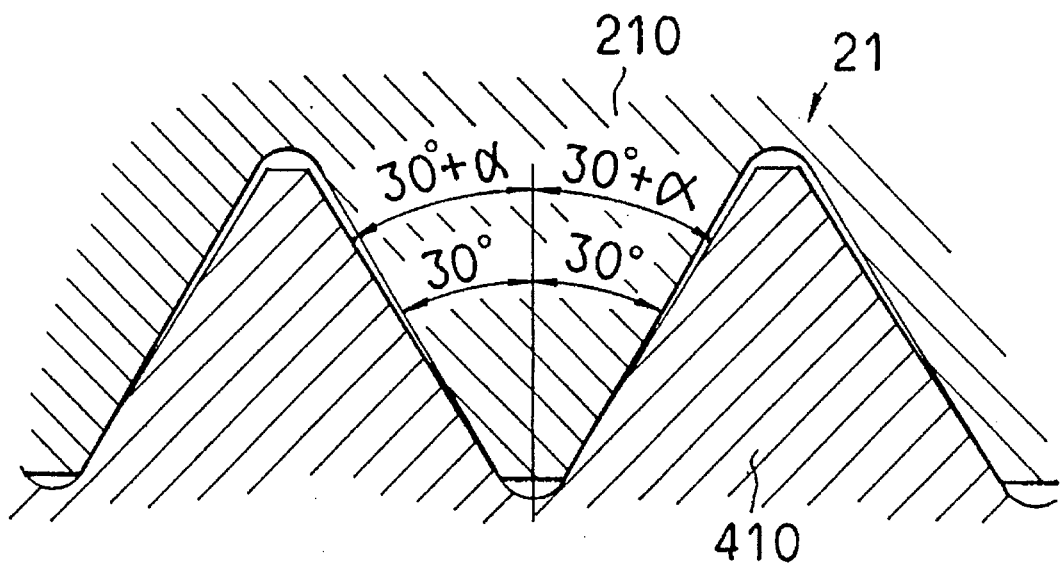
FIG. 6 is a view similar to FIG. 2, but particularly indicating a standardized bolt and a high-strength nut according to a third embodiment of the present invention.
Figure 7:
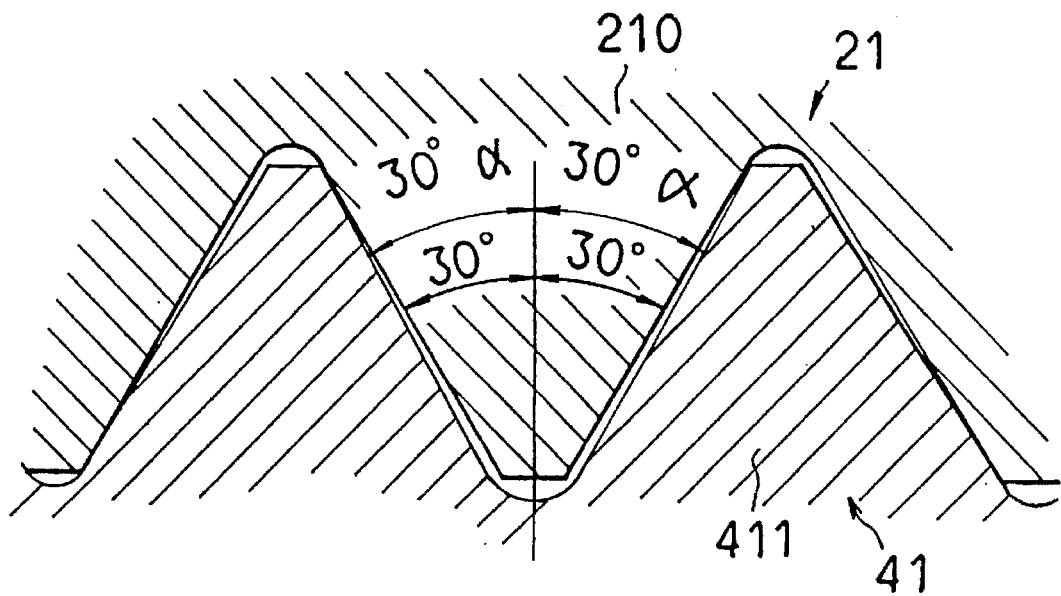
FIG. 7 is a view similar to FIG. 2, but particularly indicating a standardized bolt and a high-strength nut according to a fourth embodiment of the present invention.

FIGS. 6 and 7 depict high-strength nuts 41 according to third and fourth embodiments of the present invention, respectively.

The nut 41 shown in FIG. 6 has an internal thread 410 of which the angle between opposing flanks is chosen so as to be greater than 60°, i.e., the angle of each thread ridge of an external thread 210 of the standardized bolt 21 is greater by a predetermined angle 2α, which ranges from 0°55' to 2°.

On the other hand, the nut 41 shown in FIG. 7 has an internal thread 411 of which the angle between opposing flanks is chosen so as to be smaller than the angle of the standardized thread ridge of the external thread 210 by the predetermined angle 2α, which also ranges from 0°55' to 2°.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A clamping member comprising:

a bolt having an external triangular thread with a plurality of thread ridges with inclined flanks;

a nut having an internal triangular thread with a plurality of thread ridges with inclined flanks; and wherein the angle between the flanks of the thread ridges of said external triangular thread differs from the angle between the flanks of the thread ridges of said internal triangular thread by an angle of no greater than a range of 0°55' to 2°.

2. The clamping member according to claim 1, wherein said nut has standardized thread ridges, and said bolt comprises:

a head;

a shank integrally formed with said head; and wherein the external triangular thread is formed on said shank, and the angle between the flanks of the thread ridges of said external triangular thread differs by an angle no greater than the range of 0°55' to 2° from the angle between the flanks of the standardized thread ridges.

3. The clamping member according to claim 2, wherein the angle between the flanks of the thread ridges of said external triangular thread is greater than the angle between the flanks of the standardized thread ridges.

4. The clamping member according to claim 2, wherein the angle between the flanks of the thread ridges of said external triangular thread is smaller than the angle between the flanks of the standardized thread ridges.

5. The clamping member according to claim 1, wherein said bolt has standardized thread ridges, and the angle between the flanks of the thread ridges of the internal triangular thread differs by an angle no greater than the range of 0°55' to 2° from the angle between the flanks of the standardized thread ridges.

6. The clamping member according to claim 5, wherein the angle between the flanks of the thread ridges of said internal triangular thread is greater than the angle between the flanks of the standardized thread ridges.

7. The clamping member according to claim 5, wherein the angle between the flanks of the thread ridges of said internal triangular thread is smaller than the angle between the flanks of the standardized thread ridges.

8. A high strength bolt suited for use in combination with a nut having an internal triangular thread including standardized thread ridges with inclined flanks which diverge by a standardized angle, said high strength bolt comprising:

a head;

a shank integrally formed with said head; and wherein an external triangular thread having thread ridges with inclined flanks is formed on said shank, and the angle between the flanks of the thread ridges of said external triangular thread differs by an angle no greater than the range of 0°55' to 2° from the angle between the flanks of the standardized thread ridges.

9. The high strength bolt according to claim 8, wherein the angle between the flanks of the thread ridges of said external triangular thread is greater than the angle between the flanks of the standardized thread ridges.

10. The high strength bolt according to claim 8, wherein the angle between the flanks of the thread ridges of said external triangular thread is smaller than the angle between the flanks of the standardized thread ridges.

11. A high strength nut suited for use in combination with a bolt having an external triangular thread including standardized thread ridges with inclined flanks which diverge by a standardized angle, said high strength nut comprising an internal triangular thread having thread ridges with inclined flanks, and the angle between the flanks of the thread ridges of the internal triangular thread differs by an angle no greater than the range of 0°55' to 2° from the angle between the flanks of the standardized thread ridges.

12. The high strength nut according to claim 11, wherein the angle between the flanks of the thread ridges of said internal triangular thread is greater than the angle between the flanks of the standardized thread ridges.

13. The high strength nut according to claim 11, wherein the angle between the flanks of the thread ridges of said internal triangular thread is smaller than the angle between the flanks of the standardized thread ridges.

* * * * *